United States Patent [19]

Konrad

[11] Patent Number: 4,501,570
[45] Date of Patent: Feb. 26, 1985

[54] ADJUSTABLE FRICTION CLUTCH

[75] Inventor: Mathias Konrad, Troisdorf, Fed. Rep. of Germany

[73] Assignee: Jean Walterscheid GmbH, Lohmer, Fed. Rep. of Germany

[21] Appl. No.: 450,743

[22] Filed: Dec. 17, 1982

[30] Foreign Application Priority Data

Dec. 24, 1981 [DE] Fed. Rep. of Germany ....... 3151486

[51] Int. Cl.³ .............................................. F16D 7/02
[52] U.S. Cl. ................................... 464/48; 192/56 R; 192/110 R
[58] Field of Search .............. 192/56 R, 70.25, 110 R, 192/111 R; 464/46, 48

[56] References Cited

U.S. PATENT DOCUMENTS 2,872,794  2/1959  Slomer ................................... 464/48
2,960,852  11/1960  Schroter et al. .................. 192/56 R

FOREIGN PATENT DOCUMENTS 537604   5/1959  Belgium ............................... 464/46
1000647  1/1957  Fed. Rep. of Germany ........ 464/48
1983847  8/1966  Fed. Rep. of Germany .
2302450  9/1976  France .................................. 464/48

Primary Examiner—Stuart S. Levy
Assistant Examiner—Daniel P. Stodola
Attorney, Agent, or Firm—Toren, McGeady and Stanger

[57] ABSTRACT

A friction clutch wherein the area pressures on the friction linings can be adjusted within a predetermined range while ensuring an even distribution thereof is provided with an adjustable supporting ring acting to vary the spring pressure within said clutch, the adjustable supporting ring being provided on the surface of the clutch housing and having tongues which point radially outwardly but which extend at an oblique angle to the axis of the clutch which may be turned in one or another direction in order to increase or decrease the nominal torque of the clutch.

5 Claims, 5 Drawing Figures

ADJUSTABLE FRICTION CLUTCH

The present invention relates generally to adjustable friction clutches and more particularly to clutches of this type which are utilized for the protection of drive lines especially in the drive shafts of agricultural implements driven from the power takeoff shaft of a tractor.

The basic structural elements of the invention include at least one driving plate which is connected in rotative driving engagement with a clutch hub, the clutch hub being adapted to be connected in driving engagement with the power takeoff shaft of a tractor, and a dished clutch housing having a surface which is provided with channels uniformly distributed on the circumference thereof pointing radially inwardly and extending axially. The clutch is provided with at least one spring which acts on the clutch through a pressure plate and whose reaction force is supported via a supporting ring arranged on the surface of the clutch housing.

A friction clutch wherein one of the clutch parts is designed as a hub provided with a flange and wherein the other clutch part is formed of a dished housing is known in the prior art, for example from German Gebrauchsmuster No. 19 83 847.

In the case of the clutch described in the aforementioned German reference, the force for the springs providing a standard force at the end away from the operating parts of the clutch is supported against stops which are pressed inwardly from the housing. The disadvantage of a clutch of this type is that the amount of torque which can be transmitted by the clutch is preset at the factory where the clutch is manufactured and it cannot subsequently be adjusted. Consequently, it is not possible to adjust nominal torque of the clutch to different power requirements with different agricultural implements. Accordingly, optimal safeguarding of drive lines of implements with which the friction clutch is utilized can be achieved only within certain prescribed limits.

The invention is therefore directed toward provision of an adjustable friction clutch wherein there is provided the ability to adjust and readjust the transmitted torque within a certain range while at the same time automatically ensuring uniform distribution of the specific surface load on the frictional components transmitting the torque.

SUMMARY OF THE INVENTION

Briefly, the present invention may be described as an adjustable friction clutch particularly for protecting a drive line for an agricultural implement driven from the power takeoff shaft of a tractor comprising: a clutch hub adapted to be connected to said power takeoff shaft; at least one driving plate connected in rotative driving engagement with said clutch hub; a dished housing having a surface provided with channels uniformly distributed on the circumference thereof pointing radially inwardly and extending axially; an adjustable supporting ring arranged on the surface of said clutch housing; pressure plate means; spring means acting on said clutch through said pressure plate means with the reaction force of said spring means being supported through said supporting ring; tongue means on said supporting ring corresponding to said channels in said dished housing, said tongue means pointing radially outwardly and extending obliquely at an angle relative to a radial plane perpendicular to the axis of said clutch; said supporting ring being adjustably movable to enable adjustment of the torque transmission characteristics of said clutch; and stop means on the surface of said dished housing in the region of said channels arranged at the same distance from the edge of said housing for limiting the range of movement of said adjustable supporting ring.

Thus, in accordance with the present invention, the objectives thereof are achieved in that the supporting ring is designed as an adjusting ring provided with tongues which correspond to the channels on the housing and which point radially outwardly. The tongues form an angle in the same sense with the radial plane of the clutch and the surface of the dish-shaped clutch housing in the region of the channels is provided with stops arranged at the same distance from the edge of the clutch housing.

The advantage of the friction clutch in accordance with the invention is that the standard force of the clutch may be increased or decreased simply by turning the adjusting plate in one or the other direction.

This provides a simple method of adapting the nominal torque of the clutch to specific load requirements of an implement with which the clutch is utilized. Because the tongues are all designed in the same sense, any resulting standard force from the axial direction of the clutch due to incorrect adjustment of the clutch is automatically avoided. Additionally, the range of adjustment of the clutch is specified by the design of the clutch so that the clutch cannot be blocked.

At the same time, the clutch is locked by the set adjusting plate.

In a further embodiment of the invention, the stops are provided by apertures arranged in the region of the channels in the housing, with the aperture boundaries facing the edge of the clutch housing forming an angle with the radial plane which corresponds to the angle of the tongues.

The apertures may be easily produced with a sufficiently high degree of accuracy by means of suitable punching tools and the angular orientation of the supporting face for the adjusting ring may be produced without additional costs.

In accordance with further features of the invention, the tongues may, in the circumferential direction, be provided with a profile, with the centerline of the profile forming an angle with the radial plane of the clutch and with the aperture boundaries facing the edge of the clutch housing being provided with a profile corresponding to the profile of the tongues. This measure permits adjustment of the nominal torque of the friction clutch in predetermined graduations.

In a further embodiment of the invention, the profile may have the shape of a sawtooth. In yet another embodiment, the profile may be designed to be sinusoidal.

The step-like design of the profile of the aforementioned embodiments at the same time represents a safeguard against the adjusting plate turning backwardly.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
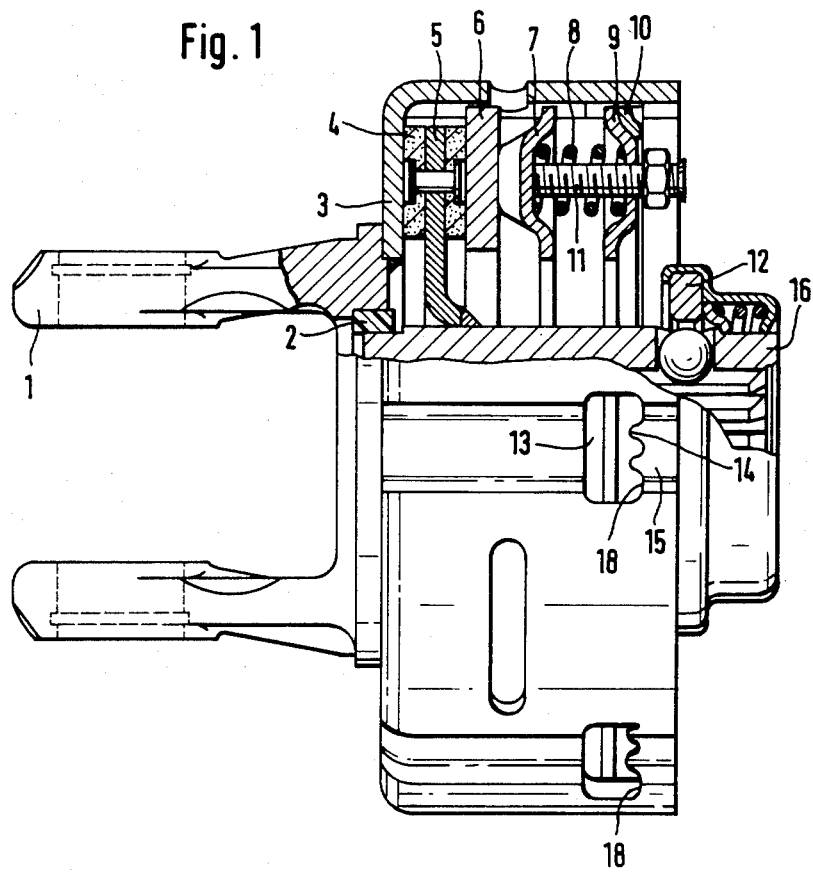
FIG. 1 is a sectional view of an adjustable friction clutch in accordance with the present invention, partially broken away.

Referring now to the drawings, the adjustable friction clutch illustrated in FIG. 1 essentially consists of a clutch hub 16 which may be slipped onto the power takeoff shaft of a tractor (not shown) and which may be firmly connected to a driving plate 5 covered on both sides with friction linings 4. The clutch hub 16 is protected against axial movement on the power takeoff shaft by means of a high speed lock 12.

A clutch housing 3 enclosing the clutch is formed with a dished configuration and is connected to a joint yoke 1. The joint yoke 1 is guided radially on the clutch hub 16 by means of a bearing 2.

On one side thereof, the driving plate 5 is provided with friction linings 4 and is frictionally engaged with the bottom of the dished clutch housing 3. On its other side, the driving plate 5 cooperates with a clutch disc 6 which is rotatively drivingly connected with the clutch housing 3.

In the case of the example illustrated, standard force is applied by helical springs 8 which are held between a pair of pressure plates 7 and 9 upon relieving screws 11. The pressure plate 7 is supported on the clutch disc 6 and the pressure plate 9 supports the reaction force of the spring through an adjusting ring 10 against stops 18 provided on the surface of the clutch housing 3.

Figure 2:
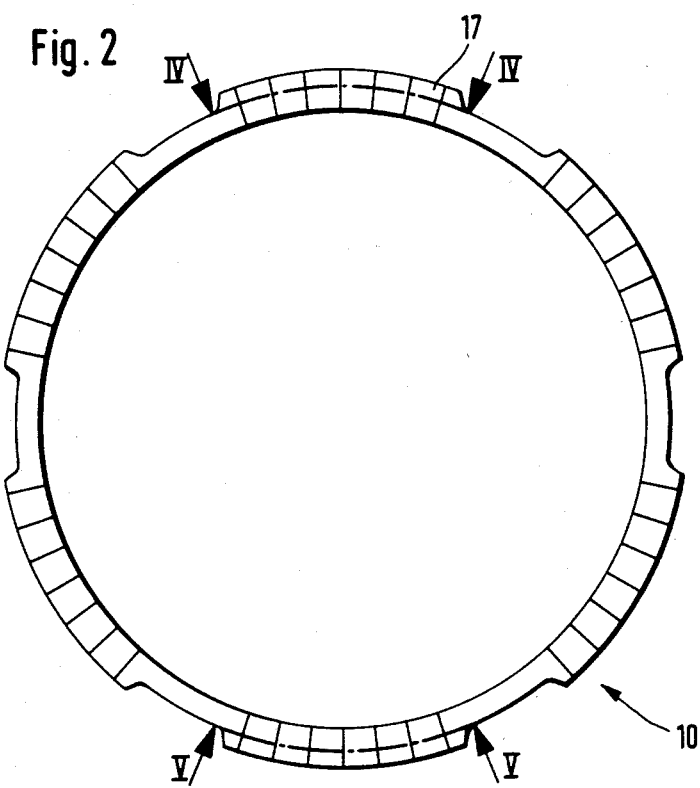
FIG. 2 is a plan view of an adjusting ring of the invention.

The adjusting ring 10 is provided with tongues 17, as shown in FIG. 2. The tongues 17 are arranged to extend obliquely relative to the axis of the clutch, or relative to a radial plane extending perpendicularly to the axis of the clutch and, as a result of the inclined design of the tongues 17, the pretension of the helical spring 8 and thus the nominal torque of the clutch may be set in a positive or negative direction by rotating the adjusting ring 10.

In FIG. 2 there is shown the adjusting ring 10 including the tongues 17. As will be seen from FIG. 2, between the tongues 17 areas of reduced diameter are provided.

Figure 4:
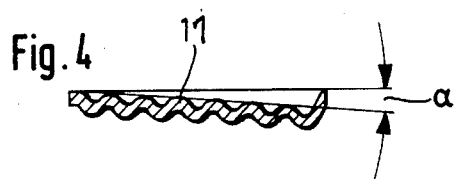
FIG. 4 is a partial sectional view taken along the line IV—IV in FIG. 2 illustrating a portion of an adjusting ring having a sinusoidal profile.
Figure 5:
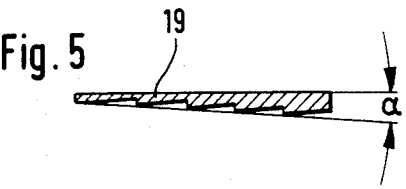
FIG. 5 is a partial sectional view taken along the line V—V of FIG. 2 illustrating a portion of an adjusting ring having a sawtoothed profile.

FIG. 4 shows in cross section tongues 17 having sinusoidal profiles. In FIG. 5 there is shown in cross section tongues 19 having sawtoothed profiles. In either case, the assemblies operate to provide a safeguard against the adjusting ring 10 turning backwardly.

Figure 3:
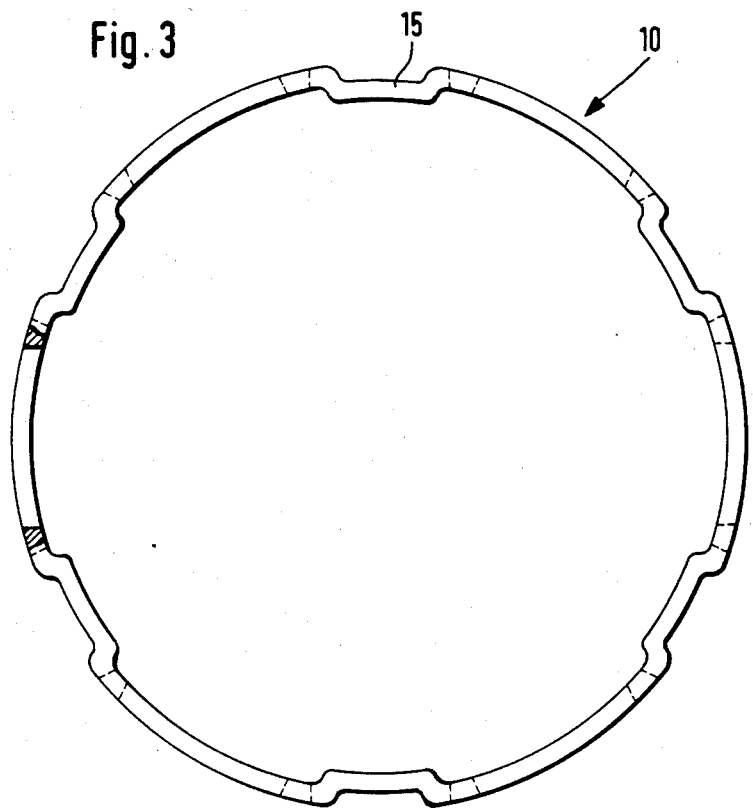
FIG. 3 is a plan view of a clutch housing used in an embodiment of the invention.

FIG. 3 shows in plan view the clutch housing 3. As will be seen from FIG. 3, the clutch housing 3 is formed with channels 15 which are arranged on the surface of the housing 3.

Referring again to FIGS. 4 and 5, it will further be seen that the tongues 17, 19 extend at an oblique angle α relative to a radial plane perpendicular to the central axis of the clutch.

Referring again to FIG. 1, it will be seen that the housing 3 is formed with stops 18 for limiting the range of movement of the adjusting ring 10. In the embodiment of FIG. 1, the stops 18 are designed as apertures 13 having stop faces 14 which are associated with the edge of the clutch housing 3 and which, in this case, are sinusoidal having different crown heights, the difference between which is adapted to the angle α of the tongues 17. In this way, a relatively uniform distribution of the area pressure at the tongues 17 is achieved.

As will be seen from FIG. 2, the adjusting ring is formed with areas of reduced outer diameter between the various tongues 17. These areas of reduced diameter correspond with the channels 15 shown in FIG. 3 in the housing 3. As can be seen in FIG. 2, the adjusting ring, between the various tongues 17, has areas of a reduced outer diameter which, by being turned into the area of the channels 15, permit the adjusting ring 10 and consequently the friction clutch to be removed. By means of the relieving screws 11, the adjusting ring, by tightening the nuts arranged on the relieving screws 11, may be relieved of the force of the helical springs 8 thereby permitting a force-free turning of the adjusting ring 10 for the purposes of setting the clutch.

Thus, by loosening the attachment of the adjusting ring 10 by the screws 11, it is possible to move the adjusting ring 10 in order thereby to set it at a position to provide a desired nominal torque setting for the clutch. It will be seen that by appropriate relative positioning of the tongues 17 relative to the channels 15, a desired setting may be readily achieved.

Thus, the object of the invention is attained by providing a friction clutch which can be adjusted within a predetermined range having a design which ensures an even distribution of the area pressure of the friction lining. The objective of the invention is achieved in that the reaction force of the spring applying the standard force is supported via the adjusting ring 10 arranged on the surface of the clutch housing 3 and provided with tongues 17 pointing radially outwardly, with the tongues 17 forming an angle α in the same sense with the radial plane. Consequently, by turning the adjusting ring 10 in either the one or the other direction it is possible to either increase or decrease the nominal torque of the clutch.

While specific embodiments of the invention have been shown and described in detail to illustrate the application of the inventive principles, it will be understood that the invention may be embodied otherwise without departing from such principles.

What is claimed is:

1. An adjustable friction clutch particularly for protecting a drive line for an agricultural implement driven from the power takeoff shaft of a tractor comprising: a clutch hub adapted to be connected to said power takeoff shaft; at least one driving plate connected in rotative driving engagement with said clutch hub; a dished housing in operative torque transmitting engagement with said clutch hub having a surface provided with channels uniformly distributed on the circumference thereof pointing radially inwardly and extending axially; an adjustable supporting ring arranged on the surface of said clutch housing; pressure plate means interposed for frictional engagement between said housing and said hub; spring means acting on said clutch through said pressure plate means with the reaction force of said spring means being supported through said supporting ring; tongue means on said supporting ring having a toothed configuration corresponding to said channels in said dished housing, said tongue means pointing radially outwardly and extending obliquely at an angle relative to a radial plane perpendicular to the axis of said clutch; said supporting ring being rotatable relative to said housing so as to adjust the tension of said spring means thereby to effect adjustment of the torque transmission characteristics of said clutch; and stop means on the surface of said dished housing in the region of said channels arranged at the same distance from the edge of said housing for limiting the range of movement of said adjustable supporting ring.

2. A clutch according to claim 1 wherein said stop means are formed by apertures provided in the region of said channels and wherein the boundaries of said apertures facing the edge of said clutch housing form an angle with the radial plane corresponding to the angle of said tongue means relative thereto.

3. A clutch according to claim 1 wherein said stop means comprise apertures in said housing, wherein in the circumferential direction said tongues are provided with a profile, wherein the centerline of said profile forms said angle with said radial plane, and wherein the boundaries of said apertures facing the edge of said housing are provided with a profile corresponding to the profile of said tongue means.

4. A clutch according to claim 1 wherein said tongue means is provided with a sawtoothed shaped profile.

5. A clutch according to claim 1 wherein said tongue means is provided with a sinusoidally shaped profile.

* * * * *